Aug. 20, 1946.  J. T. BEATTY ET AL  2,406,188
MOUNTING FOR CLEANER ELEMENTS
Filed March 25, 1943  2 Sheets-Sheet 1

Inventors
John T. Beatty
Dale L. Bennett
by Parker + Carter
Attorneys.

Patented Aug. 20, 1946

2,406,188

UNITED STATES PATENT OFFICE 2,406,188

MOUNTING FOR CLEANER ELEMENTS

John T. Beatty, Kenilworth, and Dale L. Bennett, Flossmoor, Ill., assignors to United Specialties Company, Chicago, Ill., a corporation of Delaware Application March 25, 1943, Serial No. 480,458

7 Claims. (Cl. 183—15)

This invention relates to an air filter or air cleaner designed to separate solids and other impurities from a stream of air or gaseous material. It has for one object to provide, in connection with a device of the sort indicated, a suitable filter means.

It has for another object to provide a filter means in which filter material of two different sorts is present and is intermingled to provide a homogeneous or substantially homogeneous filtering mass.

Another object is to provide a filtering unit which may be readily removed as a unit from the remainder of the air cleaning or filtering assembly and which may be readily replaced after removal and cleaning or other treatment.

Another object is to provide simple means for holding such a filter unit removably in place.

Other objects will appear from time to time throughout the specification and claims.

This invention is illustrated more or less diagrammatically in the accompanying drawings, wherein.

Like parts are indicated by like characters throughout the specification and the drawings.

Figure 1:
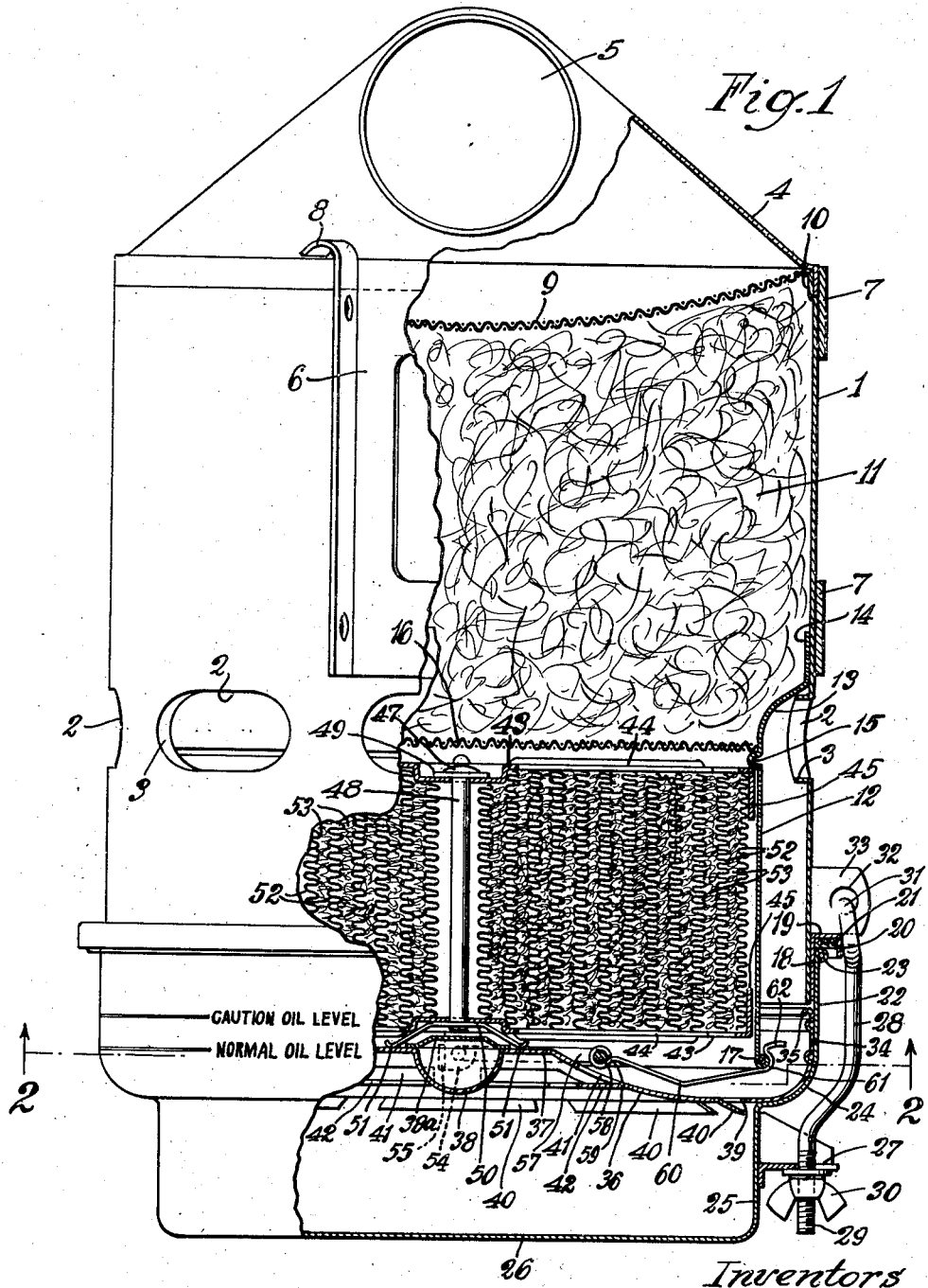
Figure 1 is a side elevation with parts broken away and parts in section showing one form of an air cleaner to which the filter unit is applied.

While the device may be applied to filters of many sorts, it is convenient to illustrate it in connection with an air cleaner, and for that purpose the air cleaner herewith illustrated is used. As shown the cleaner includes a main outer housing 1 which is provided with openings 2. The housing 1 may be inwardly bent about the openings to form flanges 3. A more or less conical cover 4 may be applied to close the housing 1, and it is provided with an opening 5 to which an outlet connection member may be attached. Mounting or attaching means of any sort may be secured to the housing 1 and serve to mount and support the cleaner as a whole in its position of use. As shown the mounting and supporting means include parts 6, 7, and 8, the details of which are not shown in full because they form no essential part of the present invention.

Within the housing 1 and preferably adjacent its top is a porous filter-retaining member 9 which may be formed of woven metal cloth and is positioned generally adjacent the top of the housing 1. If desired the upper portion of the housing may be inwardly bent as at 10 to form a shoulder upon which the periphery of the member 9 rests, and that member is held against the shoulder by the edge of the member 4, beneath which it rests. A mass of filter material 11 is positioned within the housing 1 and beneath the member 9. This filter material may be of any desired material. It is convenient to make it of metal, wool, or material woven or otherwise shaped fabric, and non-metallic filtering material may be used if desired.

Secured to the housing member 1 and preferably above the perforations 2 is a housing member 12 which is of smaller diameter than the housing 1 and is provided with a rolled or tapered portion 13 which at its outer and upper edge is provided with a cylindrical portion 14. This latter portion is in contact with the inner face of the housing 1 and is secured to it. A bead or shoulder 15 is formed in the member 12, and upon its upper face a porous or perforated member 16 is positioned. This member may be of woven material, fabric, or of other suitable material, and its purpose is to support and to prevent displacement of the filter material 11 and to permit the free passage of air or gas. The housing 12 is provided with an exteriorly formed bead or shoulder 17.

Secured to the housing member 1, preferably adjacent its lower edge, is a cylindrical member or ring 18 which is provided with a laterally bent portion 19 which terminates in a downwardly bent annular flange 20. A gasket or packing material 21 is positioned between the portions 18, 19 and 20.

A cup is provided to close the bottom of the housing 1. As shown it has two major diameters. The larger portion 22 terminates at its upper edge in a bead or shoulder 23 adapted to bear against the packing material. The portion 22 is connected by a curved member 24 to the portion 25 which is of less diameter and which is provided with a bottom 26. As shown one or more slotted abutment members 27 is secured to the cup and adapted to receive a fastening member 28 which is threaded as at 29 to receive a thumb nut 30. At its upper end each of the fastening members 28 is provided with a ring portion 31 which is received in the eye 32 of a member 33 secured to or mounted upon the exterior of the housing 1. By means of the members 28 and their associated parts the cup is removably held in place upon the main cleaner housing.

A baffle is preferably mounted within the cup and as shown the baffle comprises a portion 34 which terminates at its upper edge in a downwardly bent baffle member 35. The baffle assembly is preferably secured to the cup and may be welded or otherwise permanently fastened to it. As shown the baffle comprises a generally upwardly curved portion 36 which is provided with a flattened top 37 in which a depression 38 may be formed. A cover member 38a may be provided over the depression 38. Openings 39 are formed in the baffle and opposite each opening is formed a downwardly and outwardly inclined portion 40. A baffle may also be provided with openings 41 adjacent each of which there is formed a relatively flat inwardly extending portion 42.

The removable filter member will now be described. As shown this member includes an upper retainer 43 which is made in the form of a spider and has a plurality of spokes or radial members 44. As shown these members may be provided with raised ribs for stiffening. At its exterior the retainer comprises a cylindrical or ring-like portion 45. It may have a central depression if desired. As shown such a depression is present, and the head 47 of a bolt 48 is positioned in the depression. A washer 49 may also be present. A similar retainer is provided at the bottom of the removable unit and as shown in Figure 1 it holds the upper and lower retainers together, and it may have threaded upon or otherwise secured to its lower end a spring member 50 which as shown has a pair of downwardly inclined spring portions 51.

Positioned between the upper and lower retainers 43 is a quantity of filter material. As shown the filter material includes parts of two types. The heavy, wavy lines indicate a metallic fabric 52. This may be woven, coiled, looped, or otherwise made and is preferably made of small metallic wire. This fabric is then rolled upon itself or crimped to form a series of layers, and between each two layers there is interposed a quantity of material 53. This may be of many different forms, but as here shown it is intended to comprise hair, and the hair penetrates into the interstices in the metallic coil or metallic fabric so that the hair is distributed substantially evenly throughout the entire filter body, the metallic portion of the filter body serving thus to hold the hair in place and to prevent particles of the hair from being drawn inwardly into and through the cleaner.

Figure 2:
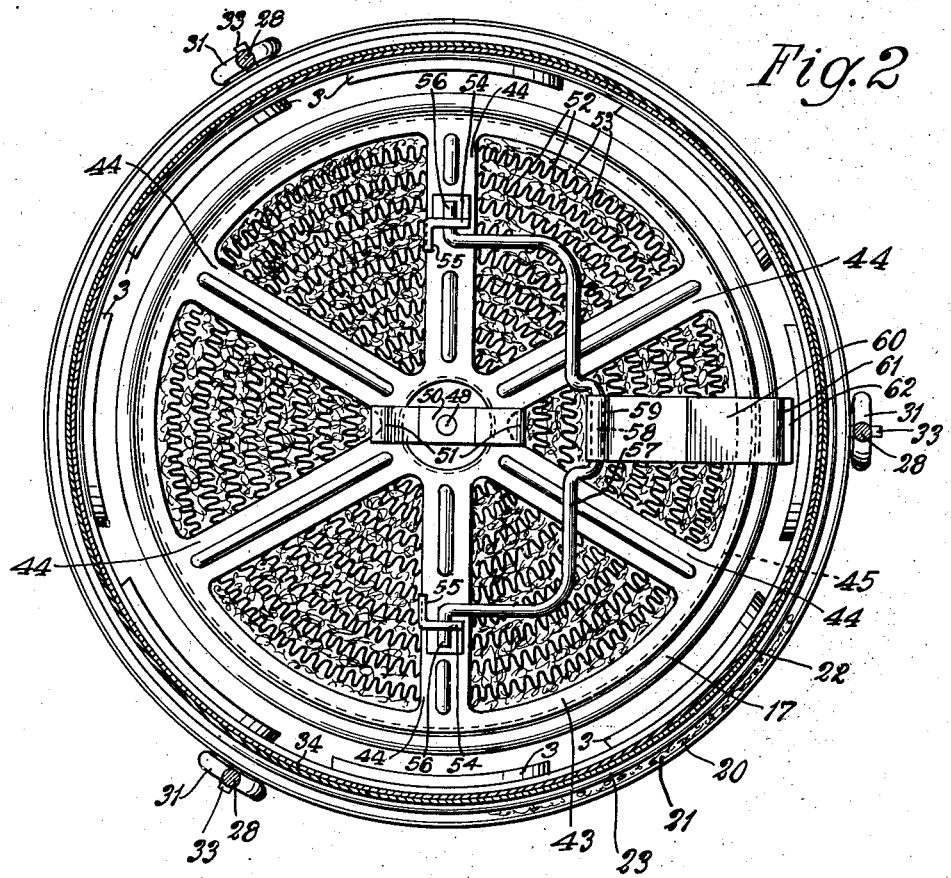
Figure 2 is a transverse section taken at line 2, 2 of Figure 1 and looking in the direction of the arrows on that figure.

As a means for removing and holding the filtering unit, the handle construction shown is provided. As shown particularly in Figure 2, two of the spokes or radial members 44 of the lower retainer 43 are provided with eye members 54, and these eye members may be provided with stop portions 55. One end 56 of a handle 57 is received in each of the eye portions 54. As shown particularly in Figure 2, the handle 57 may be provided with a laterally displaced portion 58 to which the end 59 of a spring latch 60 is pivoted. At its opposite end the spring latch 60 is provided with a curved engaging portion 61 which terminates in an outwardly directed disengaging portion 62.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention are as follows:

It will be assumed that the air cleaner is in use and that the parts are assembled as shown in the figures. Oil or some other fluid is in the cup, and the cup may be filled to one or another of the levels indicated by the lettering on Figure 1. The device may be attached to an internal combustion engine to clean and filter the air which is drawn into the engine.

When the engine is operated, air enters the openings 2, passes downwardy between the housing portion 1 and the housing portion 12 and is directed by the baffle inwardly and upwardly. It rises through the removable filter unit through the fixed filter portion and is discharged through the opening 5 into whatever connection member has been joined to that opening. During this movement of the air, the oil level in the cup will be displaced and some of the oil will be carried upwardly into the filter and thus saturate the filter material of the removable unit. As air continues to flow through the cleaner, it thus moves through a saturated filter mass and solids are removed from the air and as the oil or other filter flows downwardly again into the cup, either during the operation of the engine or during periods of nonuse, the impurities collected by the filter are carried downwardly in the oil.

After a certain amount of use it becomes necessary to replace the oil in the cup and it is desirable to clean at least a part of the filter mass. This operation is accomplished as follows: The thumb nuts are loosened, the members 28 are swung out of engagement with the slotted members 27 and the cup may then be removed. When this happens, the springs 51, which normally are under compression because of their contact with the member 37 and which thus have held the removable filter unit firmly in place to prevent rattling, are free from compression and the handle 57 is available for use. The end 62 of the spring 60 is displaced and the engaging portion 61 is thus disengaged from the bead or shoulder 17. When that happens the handle 57 may be swung downwardly and the removable filter unit may then be pulled out by the handle and may be held by the handle while the unit is cleaned. When the unit has been cleaned, it is replaced, the handle 57 is swung again to the position shown in the figures, the spring latch 60, is moving upwardly, and the portion 61 is engaged on the bead 17. The stop portions 55 of the eye members 54 prevent the handle 57 from moving in the wrong direction.

After the removal filter unit is in place, the cup is replaced, the portion 37 again exerts a compression upon the spring arms 51, and the removable filter section is thus yieldingly held snug against the bead or shoulder 15 to prevent rattling or displacement of the removable filter section. While the cup is removed the impure oil is discharged and clean oil or other fluid is supplied. When the removable filter unit and the cup with its clean fluid have been replaced, the members 28 are swung again into engagement with the slotted members 27, the thumb nuts are tightened, and the cleaner is in condition for use.

The mechanism shown provides, therefore, adequate filter means and a simple means for cleaning the lower portion of the filter mass. This is, of course, the portion in which most of the impurities are collected and it is, therefore, the portion which most requires cleaning. The use of filter material of two sorts in the removable filter element improves the filtering action, and at the same time the use of the relatively strong metallic fabric permits the use of the relatively weaker hair-like material without the danger of the displacement of such material and without any likelihood that such displaced hair material will be carried into the engine to which the cleaner is attached.

We claim:

1. In combination in an air cleaner, a single, unitary housing member forming the housing of said cleaner and also forming a gas passage, a removable filter assembly positioned therein, said assembly including a plurality of perforate supporting members and a filter mass comprising the means for holding them in spaced apart relation, said housing having a stop against which one of said supporting members abuts when the filter is in position, said housing having also an engagement part, there being a handle movably mounted upon one of said supporting members, and a latch part positioned on said handle and adapted, when the filter assembly is in position within the housing, to be latched upon said engaging member, and a cup means removably closing said air cleaner, parts in said cup means adapted, when the cup is in position, to cover said handle and said latch means and to contact and hold them from movement.

2. In combination in an air cleaner, a housing member forming a gas passage, a removable filter assembly positioned therein, said assembly including a plurality of perforate supporting members and a filter mass comprising means for holding them in spaced apart relation, each of said supporting members having an annular flange, the flanges of the members extending toward and stopping short of each other, said housing having a stop against which one of said supporting members abuts when the filter is in position, said housing having also an engagement part, there being a handle movably mounted upon one of said supporting members, and a latch part positioned on said handle and adapted, when the filter assembly is in position within the housing, to be latched upon said engaging member, and a cup means removably closing said air cleaner, parts in said cup means adapted, when the cup is in position, to cover said handle and said latch means and to prevent their movement.

3. In combination in an air cleaner, a single housing member forming a gas passage, a fixed and a removable filter assembly positioned therein, said last-mentioned assembly including a plurality of perforate supporting members, a filter mass, positioned between said perforate members, comprising means for holding them in spaced apart relation, said housing having a stop against which one of said supporting members abuts when the filter is in position, said housing having also an engagement part, there being a handle movably mounted upon one of said supporting members, and a spring latch part movably positioned on said handle and adapted, when the filter assembly is in position within the housing, to be latched upon said engaging member, and a cup means removably closing said air cleaner, parts in said cup means adapted, when the cup is in position, to cover said handle and said latch means and to contact and hold them against movement.

4. In combination in an air cleaner, a housing member forming by itself a gas passage, a fixed and a removable filter assembly positioned therein, said last-mentioned assembly including a plurality of perforate supporting members and means for holding them in spaced apart relation, said housing having a stop against which both of said filter assemblies abut when the filters are in position, said housing having also an engagement part, there being a handle movably mounted upon one of said supporting members, and a latch part positioned on said handle and adapted, when the filter assembly is in position within the housing, to be latched upon said engaging member, and a cup means removably closing said air cleaner, parts in said cup means adapted, when the cup is in position, to cover said handle and said latch means and to prevent their movement, and a quantity of filter material supported by said supporting members, said filter material including a quantity of structurally strong, regularly arranged material, and a quantity of structurally weak material interposed between and extending into said structurally strong material, said strong material comprising the means for holding said perforate supporting members apart.

5. In combination in an air cleaner, a housing member forming by itself a gas passage, a fixed and a removable filter assembly having open sides and being positioned therein, said last-mentioned assembly including a plurality of perforate supporting members and means for holding them in spaced apart relation, said housing having a stop against which each of said filter assemblies abuts when the filter is in position, said housing having also an engagement part, there being a handle movably mounted upon one of said supporting members, and a latch part positioned on said handle and adapted, when the filter assembly is in position within the housing, to be latched upon said engaging member, a cup means removably closing said air cleaner, parts in said cup means adapted, when the cup is in position, to cover said handle and said latch means and to prevent their movement, said filter assembly including a plurality of layers of metallic material, said layers being separated and disposed in the direction of air movement, and a quantity of hair positioned between said layers of metallic material and extending into said layers.

6. In combination in an air cleaner, a housing member forming a gas passage, a removable filter assembly positioned therein, said filter assembly having open sides and including a plurality of perforate supporting members and means for holding them in spaced apart relation, said housing having a stop against which one of said supporting members abuts when the filter in position, said housing having also an engagement part, there being a handle movably mounted upon one of said supporting members, and a latch part positioned on said handle and adapted, when the filter assembly is in position within the housing, to be latched upon said engaging member, a cup means removably closing said air cleaner, parts in said cup means adapted, when the cup is in position, to cover said handle and said latch means and to prevent their movement, and a spring part carried by one of said supporting members and positioned to be contacted and compressed by the said parts which are fixed upon said cup means.

7. In combination in an air cleaner, a housing member forming a gas passage, a removable open-sided filter assembly positioned therein, said assembly including a plurality of perforate supporting members and means for holding them in spaced apart relation, each of said supporting members having an annular flange, the flanges of the members extending toward each other, said housing having a stop against which one of said supporting members abuts when the filter is in position, said housing having also and engagement part; there being a handle movably mounted upon one of said supporting members, and a spring latch part movably positioned on said handle and adapted, when the filter assembly is in position within the housing, to be latched upon said engaging member, a cup means removably closing said air cleaner, parts in said cup means adapted, when the cup is in position, to cover said handle and said latch means and to prevent their movement, and a spring part carried by one of said supporting members and positioned to be contacted and compressed by the said parts which are fixed upon said cup means.

JOHN T. BEATTY.
DALE L. BENNETT.